United States Patent
Dai et al.

(10) Patent No.: US 12,538,210 B2
(45) Date of Patent: Jan. 27, 2026

(54) NETWORK ACCESS METHOD AND APPARATUS, RESOURCE MAINTENANCE METHOD AND APPARATUS, AND DEVICE AND STORAGE MEDIUM

(71) Applicant: ZTE CORPORATION, Shenzhen (CN)

(72) Inventors: Bo Dai, Shenzhen (CN); Shuqiang Xia, Shenzhen (CN); Feng Xie, Shenzhen (CN); Zhifeng Yuan, Shenzhen (CN); Xiubin Sha, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 429 days.

(21) Appl. No.: 18/009,079

(22) PCT Filed: Jun. 1, 2021

(86) PCT No.: PCT/CN2021/097575
§ 371 (c)(1),
(2) Date: Dec. 8, 2022

(87) PCT Pub. No.: WO2021/249235
PCT Pub. Date: Dec. 16, 2021

(65) Prior Publication Data
US 2023/0239771 A1 Jul. 27, 2023

(30) Foreign Application Priority Data
Jun. 8, 2020 (CN) .......................... 202010515074.4

(51) Int. Cl.
*H04W 48/12* (2009.01)

(52) U.S. Cl.
CPC .................................. *H04W 48/12* (2013.01)

(58) Field of Classification Search
None
See application file for complete search history.

(56) References Cited

U.S. PATENT DOCUMENTS

2017/0311217 A1* 10/2017 Jung ..................... H04W 48/08
2018/0091968 A1   3/2018 Ly et al.
(Continued)

FOREIGN PATENT DOCUMENTS

| CN | 103716856 A | 4/2014 |
|---|---|---|
| CN | 105794295 A | 7/2016 |

(Continued)

OTHER PUBLICATIONS

Extended European Search Report in Application No. 21822519.1, dated May 22, 2024, 8 pages.

(Continued)

*Primary Examiner* — Hong S Cho
(74) *Attorney, Agent, or Firm* — Morgan, Lewis & Bockius LLP

(57) ABSTRACT

Disclosed are a network access method and apparatus, a resource maintenance method and apparatus, a device, and a storage medium. The network access method includes receiving the system message of a first cell sent by a second node, where the system message of the first cell includes the configuration information of a second cell; and accessing the second cell based on the configuration information of the second cell.

19 Claims, 5 Drawing Sheets

---

Send the system message of the second cell, where the system message of the second cell is used to instruct the first node to access the second cell, where the time-frequency position where the system message of the second cell is sent is configured by the system message of the first cell, or the downlink control channel search space corresponding to the system message of the second cell is configured by the system message of the first cell, or the time-frequency position of the downlink control channel search space corresponding to the system message of the second cell is predefined ⎯S31

(56) References Cited

U.S. PATENT DOCUMENTS

| | | | |
|---|---|---|---|
| 2019/0053135 A1 | 2/2019 | Hahn et al. | |
| 2019/0174278 A1* | 6/2019 | Fujishiro | H04W 4/40 |
| 2020/0028640 A1* | 1/2020 | Yeo | H04L 5/0007 |

FOREIGN PATENT DOCUMENTS

| | | |
|---|---|---|
| CN | 107612667 A | 1/2018 |
| CN | 109328474 A | 2/2019 |
| CN | 111901849 A | 11/2020 |
| KR | 10-2015-0038581 A | 4/2015 |
| KR | 10-2017-0042305 A | 4/2017 |

OTHER PUBLICATIONS

Chinese Office Action in Application No. 202010515074.4 dated Jul. 18, 2024, 18 pages including translation.
First Search Report in Chinese Application No. 202010515074.4, dated Jul. 16, 2024, 6 pages including translation.
Institute for Information Industry, "Discussion on System Information Delivery in NR", 3GPP TSG RAN WG1 meeting #86bis, R1-1610207, Lisbon, Portugal Oct. 10-14, 2016, 5 pages.
Institute for Information Industry, "Discussion on System Information Acquistion", 3GPP TSG-RAN WG2 Meeting#95, R2-165257, Aug. 22-26, 2016, Göteborg, Sweden, 4 pages.
ZTE Corporation, Sanechips, "Remaining FFSs for PUR", 3GPP TSG-RAN WG2 Meeting#110 e-Meeting, R2-2005035, Jun. 1-12, 2020, 7 pages.
International Search Report in Application No. PCT/CN2021/097575, dated Aug. 24, 2021, 5 pages including translation.
First Office Action in Korean Application No. 10-2023-7000832, dated May 23, 2025, 16 pages, including translation.

* cited by examiner

Send the system message of the second cell, where the system message of the second cell is used to instruct the first node to access the second cell, where the time-frequency position where the system message of the second cell is sent is configured by the system message of the first cell, or the downlink control channel search space corresponding to the system message of the second cell is configured by the system message of the first cell, or the time-frequency position of the downlink control channel search space corresponding to the system message of the second cell is predefined ~S31

FIG. 4

Send CP-PUR configuration information, where the CP-PUR configuration information includes a CP-PUR configuration identifier ~S41

Receive a first message of a CP scheme, where the first message carries the CP-PUR configuration identifier, and the first message is used to identify or maintain the CP-PUR of the first node ~S42

FIG. 5

Receive the CP-PUR configuration information, where the CP-PUR configuration information includes a CP-PUR configuration identifier ~S61

In the case where the first node configures the CP-PUR, send the first message, where the first message carries the CP-PUR configuration identifier, and the first message is used by the second node to identify or maintain the CP-PUR of the first node ~S62

FIG. 6

NETWORK ACCESS METHOD AND APPARATUS, RESOURCE MAINTENANCE METHOD AND APPARATUS, AND DEVICE AND STORAGE MEDIUM

CROSS REFERENCE TO RELATED APPLICATIONS

This is a National Stage Application filed under 35 U.S.C. 371, based on International Patent Application No. PCT/CN2021/097575, filed on Jun. 1, 2021, which claims priority to Chinese Patent Application No. 202010515074.4 filed with the China National Intellectual Property Administration (CNIPA) on Jun. 8, 2020, the disclosures of which are incorporated herein by reference in their entireties.

TECHNICAL FIELD

The present application relates to the field of radio communication network technology, for example, a network access method and apparatus, a resource maintenance method and apparatus, a device, and a storage medium.

BACKGROUND

A cellular network architecture improves the utilization rate and system capacity of a spectrum resource through frequency multiplexing technology and cell splitting technology, thereby supporting the rapid development of mobile communications. To satisfy ever-increasing traffic requirements, the entire evolution of mobile communications from the 1st generation mobile communication technology (1G) to 5G is based on a cellular network, that is, a method of macrocellular cell splitting and a method of vertical microcellular network layering are adopted.

With the deployment of various low-power network nodes such as various micro cells, small cells, home base stations, and relay nodes in conventional cellular networks, cellular networks are becoming denser and denser. Since each small cell (micro cell) is an independent cell, every time user equipment (UE) enters a small cell, the user equipment needs to perform downlink synchronization again to acquire the system message of the small cell. The UE in an idle state frequently handovers cells in the moving process. As a result, a large amount of power consumption of the UE is wasted. If a network needs to page UE, the UE needs to be paged in many small cells. However, the UE is located in only one small cell. As a result, a lot of downlink resources are wasted.

SUMMARY

The present application provides a network access method and apparatus, a resource maintenance method and apparatus, a device, and a storage medium to solve the problem of wasting power consumption of UE and downlink resources.

An embodiment of the present application provides a network access method. The method is applied to a first node and includes receiving the system message of a first cell sent by a second node, where the system message of the first cell includes the configuration information of a second cell; and accessing the second cell based on the configuration information of the second cell.

An embodiment of the present application provides a network access method. The method is applied to the second node and includes sending the system message of the first cell. The system message of the first cell includes the configuration information of the second cell. The configuration information of the second cell is used to instruct the first node to access the second cell.

An embodiment of the present application provides a network access method. The method is applied to a third node and includes sending the system message of the second cell. The system message of the second cell is used to instruct the first node to access the second cell. The time-frequency position where the system message of the second cell is sent is configured by the system message of the first cell. Alternatively, the downlink control channel search space corresponding to the system message of the second cell is configured by the system message of the first cell. Alternatively, the time-frequency position of the downlink control channel search space corresponding to the system message of the second cell is predefined.

An embodiment of the present application provides a resource maintenance method. The method includes sending cyclic prefix-preconfigured uplink resource (CP-PUR) configuration information, where the CP-PUR configuration information includes a CP-PUR configuration identifier; and receiving a first message of a CP scheme. The first message carries the CP-PUR configuration identifier.

An embodiment of the present application provides a resource maintenance method. The method includes receiving the CP-PUR configuration information, where the CP-PUR configuration information includes a CP-PUR configuration identifier; and in the case where a CP-PUR is configured, sending the first message. The first message carries the CP-PUR configuration identifier.

An embodiment of the present application provides a network access apparatus. The apparatus is configured at the first node and includes a first receiving module and an access module.

The first receiving module is configured to receive the system message of the first cell sent by the second node. The system message of the first cell includes the configuration information of the second cell. The access module is configured to access the second cell based on the configuration information of the second cell.

An embodiment of the present application provides a network access apparatus. The apparatus is configured at the second node and includes a first sending module.

The first sending module is configured to send the system message of the first cell. The system message of the first cell includes the configuration information of the second cell. The configuration information of the second cell is used to instruct the first node to access the second cell.

An embodiment of the present application provides a network access apparatus. The apparatus is configured at the third node and includes a second sending module.

The second sending module is configured to send the system message of the second cell. The system message of the second cell is used to instruct the first node to access the second cell. The time-frequency position where the system message of the second cell is sent is configured by the system message of the first cell. Alternatively, the downlink control channel search space corresponding to the system message of the second cell is configured by the system message of the first cell. Alternatively, the time-frequency position of the downlink control channel search space corresponding to the system message of the second cell is predefined.

An embodiment of the present application provides a resource maintenance apparatus. The apparatus includes a third sending module and a third receiving module.

The third sending module is configured to send the CP-PUR configuration information. The CP-PUR configuration information includes a CP-PUR configuration identifier. The third receiving module is configured to receive the first message of the CP scheme. The first message carries the CP-PUR configuration identifier.

An embodiment of the present application provides a resource maintenance apparatus. The apparatus includes a fourth receiving module and a fourth sending module.

The fourth receiving module is configured to receive the CP-PUR configuration information. The CP-PUR configuration information includes a CP-PUR configuration identifier. The fourth sending module is configured to, in the case where the CP-PUR is configured in the fourth sending module, send the first message. The first message carries the CP-PUR configuration identifier.

An embodiment of the present application provides a device. The device includes one or more processors and a memory configured to store one or more programs.

When executing the one or more programs, the one or more processors perform any method according to embodiments of the present application.

An embodiment of the present application provides a storage medium. The storage medium stores a computer program. When executing the computer program, a processor performs any method according to the embodiments of the present application.

BRIEF DESCRIPTION OF DRAWINGS

FIG. 4 is a flowchart of a network access method according to an embodiment of the present application.

FIG. 5 is a flowchart of a resource maintenance method according to an embodiment of the present application.

FIG. 6 is a flowchart of a resource maintenance method according to an embodiment of the present application.

DETAILED DESCRIPTION

Embodiments of the present application are described below in conjunction with drawings.

The steps illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from the sequences described herein.

The technical solutions of the present application may be applied to such communications systems as Global Systems for Mobile Communications (GSMs), code-division multiple access (CDMA) systems, wideband code-division multiple access (WCDMA) systems, General Packet Radio Services (GPRSs), Long Term Evolution (LTE) systems, Long Term Evolution Advanced (LIE-A) systems, Universal Mobile Telecommunications Systems (UMTSs) and 5G systems. These are not limited the embodiments of the present application. In the present application, a 5G system is used as an example.

Figure 1:
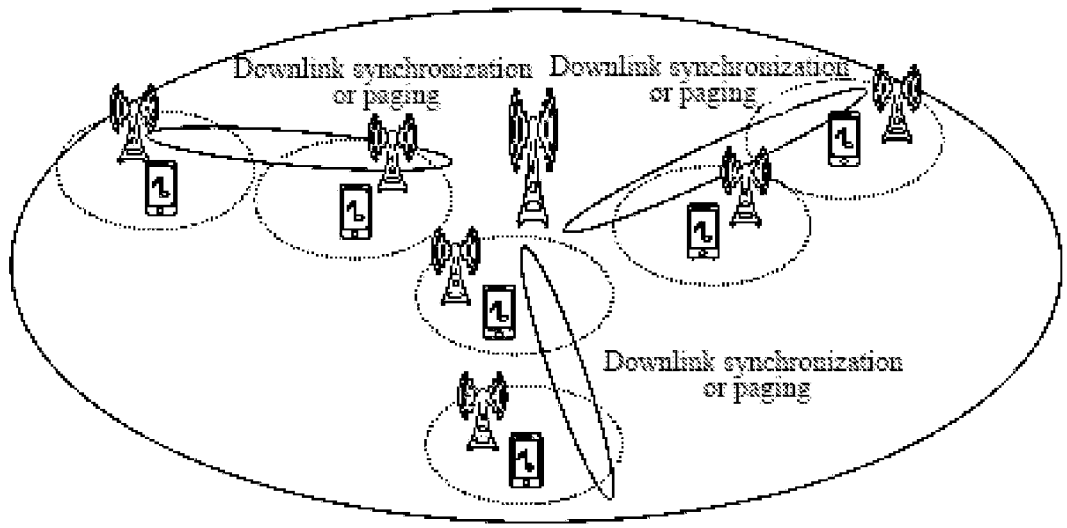
FIG. 1 is a diagram illustrating the structure of a radio network system according to an embodiment of the present application.

The embodiments of the present application may be applied to radio networks of different standards. Radio access networks may include different communication nodes in different systems. FIG. 1 is a diagram illustrating the structure of a radio network system according to an embodiment of the present application. As shown in FIG. 1, the radio network system aggregates multiple small cells together as a super cell. A base station performs paging, access, and data transmission in the super cell and performs access and data transmission in a small cell. Alternatively, the base station performs data transmission only in the small cell. UE in an idle state performs downlink synchronization with the super cell, and the UE in a connected state performs downlink synchronization with the small cell.

First, the base station may be a device capable of communicating with a user terminal. The base station may be any device having a radio receiving-sending function and includes, but is not limited to, a base station (NodeB), an evolved base station (eNodeB), a base station in the 5G communication system, a base station in a future communication system, an access node in a Wi-Fi system, a radio relay node, and a radio return node. The base station may also be a radio controller in a cloud radio access network (C-RAN) scene. The base station may also be a Small Cell or a transmission reference point (TRP). The embodiments of the present application are not limited. A first cell or the super cell mentioned in the present application corresponds to a second node or a first base station. A second cell or the small cell mentioned in the present application corresponds to a third node or a second base station. That is, the system message of the first cell corresponds to the system message of the first base station; the system message of the second cell corresponds to the system message of the second base station; the system message sent by the first cell corresponds to the system message sent by the first base station; and the system message sent by the second cell corresponds to the system message sent by the second base station.

In this embodiment of the present application, the user terminal is a device having a radio receiving-sending function. The device may be deployed on land including indoors, outdoors, handled, wearable or vehicle-mounted; may be deployed on water (for example, on a ship); and may be deployed in the air (for example, on an airplane, balloon, or satellite). The user terminal may be a mobile phone, a tablet computer, a computer having a radio receiving-sending function, a virtual reality (VR) terminal, an augmented reality (AR) terminal, a radio terminal in industrial control, a radio terminal in self-driving, a radio terminal in telemedicine, a radio terminal in a smart grid, a radio terminal in transportation safety, a radio terminal in a smart city, and a radio terminal in smart home. Application scenarios are not limited in the embodiments of the present application. The user terminal may also sometimes called a terminal, an access terminal, a UE unit, a UE station, a mobile station, a mobile platform, a remote station, a remote terminal, a mobile equipment, a UE terminal, a radio communication device, a UE agent, or a UE apparatus. This is not limited in the embodiments of present application.

Figure 2:
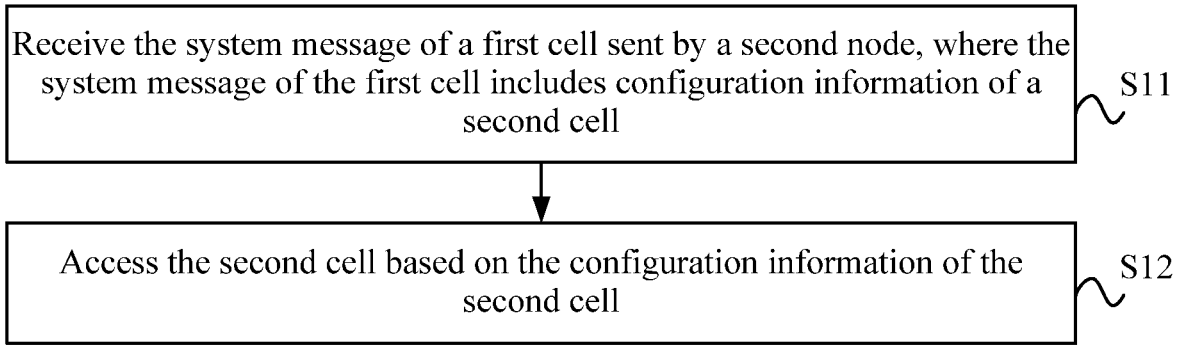
FIG. 2 is a flowchart of a network access method according to an embodiment of the present application.

In an embodiment, the present application provides a network access method. FIG. 2 is a flowchart of a network access method according to an embodiment of the present application. The method can be applied to the case where UE needs to handover cells frequently in a dense deployment scenario. This method may be executed by a network access apparatus provided by the present application. The network access apparatus may be performed by software and/or hardware. The method is applied to a first node.

As shown in FIG. 2, the network access method provided by this embodiment of the present application mainly includes steps S11 and S12.

In S11, the system message of a first cell sent by a second node is received. The system message of the first cell includes the configuration information of a second cell.

In S12, the second cell is accessed based on the configuration information of the second cell.

In this embodiment, the first node may be any of the preceding user equipment. The second node may be any of the preceding base stations. The first cell is the super cell as shown in FIG. 1. The second cell is a small cell as shown in FIG. 1. Multiple second cells are aggregated together as one super cell. Paging, access, and data transmission are performed in the super cell.

Multiple small cells are aggregated together as one super cell. The super cell transmits a downlink synchronization channel and the system message of the super cell. The super cell sends a paging message according to the paging configuration information in the system message of the super cell, that is, the small cells in a certain range or region share the same downlink synchronization channel and have the same subframe synchronization and frame synchronization. In addition, the sub-signal of a small cell may also be used as the downlink synchronization channel of the small cell. The UE accessing the second cell performs synchronization according to the sub-signal. Each small cell may or may not have the ID of each small cell. Each small cell has the specific system message of each small cell. The UE may perform access on the exclusive access resource configured by the system message of each small cell. In addition, the exclusive access resource configuration information of a small cell may also be transmitted in the system message of the super cell.

The UE searches for the downlink synchronization signal of the super cell, performs downlink synchronization with the super cell, aligns with the subframe and frame of the super cell, then acquires the system message of the super cell, obtains a radio frame number and the configuration information of the downlink control channel corresponding to the system message of the super cell, detects the downlink control information corresponding to the system message of a small cell on a time-frequency resource indicated by the configuration information, obtains the system message of the small cell according to a time-frequency position indicated by the downlink control information after the downlink control information is detected, and monitors for pages according to the paging message configuration information carried in the system message of the small cell. The UE in an idle state or an inactive state monitors only the paging message sent by the super cell (the system message of the small cell sent by the small cell does not include the paging configuration information of the small cell). Alternatively, when the UE in the idle state or the inactive state still camps on the small cell where the UE is in a connected state, the UE monitors the paging message sent by the small cell (does not monitor the paging message sent by the super cell, where the system message of the small cell sent by the small cell includes the paging configuration information of the small cell). When the UE in the idle state or the inactive state does not camp on the small cell where the UE is in the connected state, the UE monitors only the paging message sent by the super cell.

When the UE in the idle state or the inactive state selects a cell or handover cells, the UE selects only the super cell for measurement or a handover or camping, does not measure the signal of a small cell, and does not select a small cell for camping or a handover. In this manner, it is possible to reduce the measurement power consumption of the UE in the idle state or the inactive state, reduce the number of cell handovers, and reduce the power consumption of the UE. That is, the UE measures a small cell only at the time of access and selects the super cell or a small cell to access according to the measurement result. When the UE is in the idle state or the inactive state, the UE does not measure a small cell during intra-frequency neighbor cell measurement or inter-frequency neighbour cell measurement, but measures only the super cell. In this manner, during a cell handover or cell reselection, only the super cell is reselected, and a small cell is not selected. Only the UE in the connected state measures a small cell during the intra-frequency neighbor cell measurement or inter-frequency neighbour cell measurement (at this time, there are three possibilities: only the small cell is measured, only the super cell is measured, or the small cell and the super cell are measured, and how to perform selection may be indicated in the system message of the small cell sent by the small cell). The UE selects a small cell or the super cell to access according to the measurement result.

The super cell referred to herein corresponds to the first cell, and the small cell corresponds to the second cell.

In an embodiment, the configuration information of the second cell includes one or more of the indication information of the second cell, the configuration information of the system message of the second cell, the sub-signal configuration information of the second cell, the list information of the second cell, and the access configuration information of the second cell. The indication information of the second cell is used to indicate whether the second cell exists (also indicates whether a second cell exists in the range of the first cell, or whether the UE needs to measure the second cell when camping on the first cell, or whether the UE needs to measure the second cell when camping on the first cell and performing access).

In an embodiment, the configuration information of the system message of the second cell includes one or more of the time-frequency position information corresponding to the system message of the second cell, the downlink control channel search space configuration information corresponding to the system message of the second cell, and the reference signal configuration information corresponding to the system message of the second cell.

In an embodiment, the second cell is accessed in the following manners based on the configuration information of the second cell: The downlink control channel corresponding to the system message of the second cell is detected; the system message of the second cell is acquired based on the downlink control channel; and the second cell is accessed based on the system message of the second cell.

The configuration information of the system message of the second cell includes the access configuration information of the second cell. The UE selects to access the second cell according to the sub-signal of the second cell and sends an access signal or an access channel to access the second cell according to the access configuration information of the second cell in the configuration information of the system message of the second cell sent by the first cell.

The configuration information of the system message of the second cell includes the list information of the second cell. A list includes an intra-frequency neighbor cell list and/or an inter-frequency neighbor cell list. The UE selects a cell for measurement according to the cell list information in the configuration information of the system message of the second cell sent by the first cell and selects a cell to access according to the measurement result. Alternatively, the UE in the idle state or the inactive state selects a cell for measurement according to the list information of the first cell sent by the first cell and selects a cell for a handover or camping according to the measurement result.

The configuration information of the system message of the second cell also includes the access control information of the second cell. The access control information of the second cell is used to indicate whether the UE may access the second cell.

The system message of the second cell sent by the second cell (third node) includes the list information of the first cell and/or the list information of the second cell. The list includes an intra-frequency neighbor cell list and/or an inter-frequency neighbor cell list. The UE camped on the second cell selects a cell for camping or a handover or reselection according to the cell list information in the system message of the second cell.

In an embodiment, the downlink control channel corresponding to the system message of the second cell is detected in the following manner: When the configuration information of the second cell includes the configuration information of the system message of the second cell, and the configuration information of the system message of the second cell includes the downlink control channel search space configuration information corresponding to the system message of the second cell, the downlink control channel corresponding to the system message of the second cell is detected on a resource corresponding to the configuration information of the system message of the second cell.

In an embodiment, the downlink control channel corresponding to the system message of the second cell is detected in the following manner: When the configuration information of the second cell does not include the downlink control channel search space configuration information corresponding to the system message of the second cell, the downlink control channel corresponding to the system message of the second cell is detected at the time-frequency position of a preset search space.

In this embodiment, the downlink control information configuration corresponding to the system message of each small cell is configured for the small cell, such as the time-frequency position of the search space, a mapping position, the size of a candidate set, and aggregation level information. The downlink control information includes the scheduling information of a data channel bearing the system message of the small cell, such as the time-frequency position information of the data channel and the modulation and coding information of the data channel. It is also possible that all the small cells in the super cell share the same configuration information of the system message, and all the small cells share the same downlink control information search space, or the super cell independently configures the system message of a small cell.

In an embodiment, the time-frequency position of the preset search space includes one or more of the following: a preset fixed time-frequency position, a preset offset relative to the time-frequency position of the synchronization signal block (SSB) of the first cell, and a preset offset relative to a sub-signal time-frequency position.

In an embodiment, the second cell is accessed in the following manners based on the system message of the second cell: The sub-signal of the second cell is detected; and the second cell whose sub-signal satisfies a requirement is selected to access a network.

In an embodiment, the second cell whose sub-signal satisfies the requirement includes one or more of a second cell having the strongest sub-signal strength, any second cell in a second cell set in which the sub-signal strength exceeds a threshold, and a second cell whose signal strength is greater than the signal strength of the first cell. When the detected signal strength of the second cell is less than the threshold, or when the detected signal strength of all the second cells is less than the signal strength of the first cell, the UE accesses the first cell.

When the network pages the UE, the base station sends a paging message in the super cell, and the UE in the idle state performs paging and monitoring only in the range of the super cell. After the paging cell sent by the super cell is received, the UE in the idle state starts to search for a nearby small cell when there is a need to access the network and selects the small cell with the best downlink signal to access. Alternatively, when the UE in the idle state needs to transmit uplink data, the UE starts to search for a nearby small cell and selects the small cell with the best downlink signal to access. The UE in the idle state does not need to perform a cell handover in each small cell in the range of the super cell, does not need to perform synchronous tracking of the small cell on the small cell, and does not need to acquire the system message of the small cell. In this manner, the power consumption of the UE can be reduced. At the same time, and paging of the same UE in multiple small cells is avoided, thereby reducing the waste of downlink network resources. When the detected signal strength of the small cell is less than the threshold, or when the detected signal strength of all the small cells is less than the signal strength of the super cell, the UE accesses the super cell.

In an embodiment, the sub-signal of the second cell is detected in the following manner: The sub-signal of the second cell is searched at the sub-signal time-frequency position corresponding to the second cell. The sub-signal time-frequency position corresponding to the second cell is indicated by the sub-signal time-frequency position information of the second cell in the sub-signal configuration information of the second cell.

In an embodiment, the sub-signal of the second cell is detected in the following manner: The sub-signal of the second cell is detected at a preset time-frequency position. The preset time-frequency position includes one or more of the following: a preset fixed time-frequency position and a preset offset relative to the time-frequency position of the SSB of the first cell.

In an embodiment, the sub-signal configuration information of the second cell includes the sub-signal sequence information corresponding to the second cell. The sub-signal sequence information corresponding to the second cell is used to generate the sub-signal of the second cell.

In this embodiment, the sub-signal time-frequency position information and the sub-signal sequence information corresponding to each small cell are configured for the small cell. It is also possible that all the small cells in the super cell share the same sub-signal configuration of a small cell. For example, all the small cells in the super cell share the same time-frequency position. Different small cells correspond to different sub-signal sequences. A sub-signal sequence set may be predefined or may be indicated by the configuration information of a small cell.

The sub-signal is used for at least one of a small cell discovery, small cell measurement, or system message demodulation of the small cell.

In an embodiment, before the second cell is accessed, the method also includes the following: An accessible second cell is determined based on the access control information of the second cell. The access control information of the second cell is carried by the system message of the first cell and/or the system message of the second cell.

In an embodiment, after the second cell is accessed based on the configuration information of the second cell, the method also includes the following: after a radio link fails in a connected state, or cell reselection is triggered, or a cell handover is triggered, when the system message of the second cell does not include cell list information, a cell is selected to access based on a cell list in the system message of the first cell; or when the system message of the second cell does not include cell list information, the first cell is accessed.

In an embodiment, after the second cell is accessed based on the configuration information of the second cell, the method also includes the following: After the connected radio link fails, or the cell reselection is triggered, or the cell handover is triggered, the second cell or the first cell is selected to access based on the cell list information in the system message of the second cell. The cell list information includes the list information of the second cell and/or the list information of the first cell.

In an embodiment, the second cell is accessed in the following manner based on the system message of the second cell: When the configuration information of the second cell includes the access configuration information of the second cell, an access signal or access data is sent to access the second cell based on the access configuration information of the second cell.

In an embodiment, the access configuration information of the second cell includes one or more of the time-frequency position information of the access signal, the sequence information of the access signal, the time-frequency position information of the access data, the reference signal information of the access data, and the configuration information of downlink control information corresponding to an access response message.

In this embodiment, the reference signal information of the access data includes a sequence identifier and reference signal pattern information. The sequence identifier is used to generate the sequence of a reference signal. The sequence identifier is a sequence ID.

In this embodiment, the reference signal pattern information includes a first pattern and a second pattern. The first pattern and the second pattern satisfy one or more of the following conditions: The interval of the orthogonal frequency-division multiplexing (OFDM) symbol in the time domain where the reference signal corresponding to the first pattern is located is smaller than the time domain interval of the OFDM symbol in the time domain where the reference signal corresponding to the second pattern is located. The subcarrier interval of the frequency domain where the reference signal corresponding to the first pattern is located is smaller than the subcarrier interval of the frequency domain where the reference signal corresponding to the second pattern is located.

The interval of the OFDM symbol in the time domain where the reference signal corresponding to the first pattern is located is smaller than the time domain interval of the OFDM symbol in the time domain where the reference signal corresponding to the second pattern is located, which may be understood that the time domain density of the first pattern is less than the time domain density of the second pattern. For example, in the first pattern, there is one OFDM symbol of the time domain of the reference signal every 2 OFDM symbols; and in the second pattern, there is one OFDM symbol of the time domain of the reference signal every 6 OFDM symbols.

The subcarrier interval of the frequency domain where the reference signal corresponding to the first pattern is located is smaller than the subcarrier interval of the frequency domain where the reference signal corresponding to the second pattern is located, which may be understood that the frequency domain density of the first pattern is less than the frequency domain density of the second pattern. For example, in the first pattern, there is one symbol of the reference signal every 1 subcarrier interval; and in the second pattern, there is one symbol of the reference signal every 3 subcarrier intervals.

In this embodiment, the configuration information of the downlink control channel corresponding to the access response message includes the search space time-frequency position of the downlink control channel corresponding to the access response message, the mapping position of the downlink control channel corresponding to the access response message, the size of the candidate set of the downlink control channel corresponding to the access response message, and the aggregation level information of the downlink control channel corresponding to the access response message. The downlink control information includes the scheduling information of a data channel bearing a paging message, such as the time-frequency position information of the data channel and the modulation and coding information of the data channel.

In an embodiment, the method also includes the following: After the first node accesses the second cell, when the first node enters an idle state from a connected state or enters an inactive state from the connected state, the first node monitors for pages according to the paging configuration information in the system message of the first cell; or after the first node accesses the second cell, when the first node enters the idle state from the connected state or enters the inactive state from the connected state, and the first node also camps on the second cell where the first node is in the connected state, the first node monitors for pages according to the paging configuration information in the system message of the second cell; or after the first node accesses the second cell, when the first node enters the idle state from the connected state or enters the inactive state from the connected state, and the first node does not camp on the second cell where the first node is in the connected state, the first node monitors for pages according to the paging configuration information in the system message of the first cell.

In an embodiment, the method also includes the following: When the first node is in the idle state or the inactive state, the first node selects a cell based on the signal strength of the first cell.

In an embodiment, the method also includes the following: When the first node is in the idle state or the inactive state, after cell reselection is triggered, or a cell handover is triggered, the first node selects a cell based on the first cell information in the cell list information in the system message of the first cell.

Figure 3:
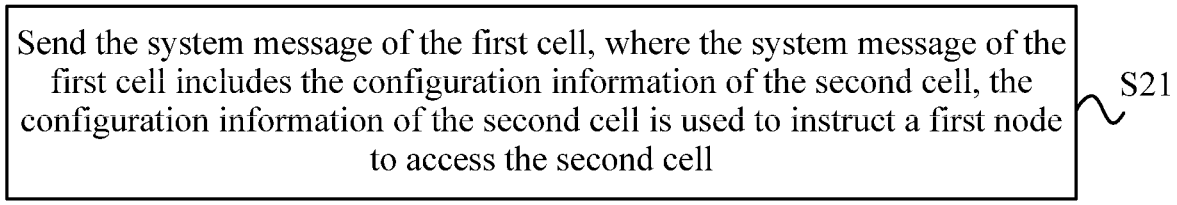
FIG. 3 is a flowchart of a network access method according to an embodiment of the present application.

In an embodiment, the present application provides a network access method. FIG. 3 is a flowchart of a network access method according to an embodiment of the present application. The method can be applied to the case where the UE needs to handover cells frequently in the dense deployment scenario. The method is also applied to a deployment scenario of a large number of distributed nodes. The method is also applied to a cell free scenario. This method may be executed by a network access apparatus provided by the present application. The network access apparatus may be performed by software and/or hardware. The method is applied to the second first node. The second node corresponds to a master node or a control node, and a third node corresponds to a child node or a distributed node or a data node.

As shown in FIG. 3, the network access method provided by this embodiment of the present application mainly includes step S21.

In S21, the system message of the first cell is sent. The system message of the first cell includes the configuration information of the second cell. The configuration information of the second cell is used to instruct the first node to access the second cell.

In an embodiment, the configuration information of the second cell includes one or more of the indication information of the second cell, the configuration information of the system message of the second cell, the sub-signal configuration information of the second cell, the list information of the second cell, the access configuration information of the second cell, and the access control information of the second cell.

In an embodiment, the indication information of the second cell is used to indicate whether the second cell exists. The configuration information of the system message of the second cell includes one or more of the time-frequency position information corresponding to the system message of the second cell, the downlink control channel search space configuration information corresponding to the system message of the second cell, and the reference signal configuration information corresponding to the system message of the second cell. The sub-signal configuration information of the second cell includes the sub-signal time-frequency position information of the second cell and/or the sub-signal sequence information of the second cell. The list information of the second cell includes the frequency point information of the second cell and/or the identifier information of the second cell. The access configuration information of the second cell includes the time-frequency position information of the access signal of the second cell or the time-frequency position information of the access channel of the second cell.

In an embodiment, the present application provides a network access method. FIG. 4 is a flowchart of a network access method according to an embodiment of the present application. The method can be applied to the case where the UE needs to handover cells frequently in the dense deployment scenario. The method is also applied to the deployment scenario of a large number of distributed nodes. The method is also applied to the cell free scenario. This method may be executed by a network access apparatus provided by the present application. The network access apparatus may be performed by software and/or hardware. The method is applied to the third node.

As shown in FIG. 4, the network access method provided by this embodiment of the present application mainly includes step S31.

In S31, the system message of the second cell is sent. The system message of the second cell is used to instruct the first node to access the second cell. The time-frequency position where the system message of the second cell is sent is configured by the system message of the first cell. Alternatively, the downlink control channel search space corresponding to the system message of the second cell is configured by the system message of the first cell. Alternatively, the time-frequency position of the downlink control channel search space corresponding to the system message of the second cell is predefined.

The system message of the second cell includes one or more of the access configuration information of the second cell, the neighbor cell list information of the second cell, the neighbor cell list information of the first cell, the access control information of the second cell, and the paging configuration information of the second cell.

In an embodiment, the method also includes the following: An access signal or access data sent by the first node is received, and an access response is sent to the first node. The access response is used to indicate that the first node accesses the second cell.

In an embodiment, the method also includes the following: The sub-signal of the second cell is sent. The sub-signal of the second cell is used for measuring the first node. The time-frequency position where the sub-signal of the second cell is sent is configured by the system message of the first cell.

In an embodiment, the predefined time-frequency position of the search space includes one or more of the following methods: a preset fixed time-frequency position, a preset offset relative to the time-frequency position of the SSB of the first cell, and a preset offset relative to a sub-signal time-frequency position.

When the access configuration information of the second cell is included in the first cell, and when no UE camps on the second cell, the second cell (the third node) may send only a sub-signal without sending other signals and data and is in an energy-saving state. The second cell detects an access signal or an access channel on the access resource configured by the first cell. If the access signal or the access channel is detected (the detected signal strength exceeds a threshold, or the channel is successfully decoded), the second cell sends an access response message. The access response message includes resource position information of the uplink data sent by the UE. Then, the second cell receives the uplink data sent by the UE and then sends the specific configuration information and/or access success indication information of the UE to the UE. Alternatively, the access response message includes the resource position information of the uplink data sent by the UE and the access success indication information. Then, the second cell receives the uplink data sent by the UE and then sends the specific configuration information of the UE to the UE. Alternatively, the access response message includes the specific configuration information of the UE and the access success indication information. The UE detects the specific search space of the UE and receives downlink data or sends uplink data according to specific configuration.

In an embodiment, the base station of the super cell sends an SSB and the system message of the super cell. The UE acquires the system message of the super cell. The UE in the idle state performs downlink synchronization, downlink measurement, and paging detection according to the SSB of the super cell and the system message of the super cell. When a downlink measurement value satisfies the cell handover trigger condition, the super cell reselection or handover is performed. The UE in the idle state does not select a small cell during a cell handover or cell reselection. The system message of the super cell includes the access configuration information of the super cell, paging configuration information, the configuration information of a small cell, the access control information of the super cell, and the neighbor cell list information of the super cell. The configuration information of the small cell includes the list information of the small cell. The list information of the small cell includes the ID information of the small cell, that is, sub-signal sequence information. The ID information of the small cell is used for generating a sub-signal of the small cell.

The UE in the idle state performs detection on the downlink control channel search space corresponding to the sending of the paging message configured in the system message of the super cell. After the downlink control channel is detected, a downlink data channel is received according to the downlink control information born by the downlink control channel, and it is confirmed whether there is the paging message of the UE in the idle state according to the information born by the downlink data channel. If there is no paging message of the UE, the paging detection continues.

If there is the paging message of the UE, and the paging message indicates that downlink data arrives or there is uplink data for transmission, the UE searches for a sub-signal of the small cell at a predefined time-frequency position according to the configuration information of the small cell in the system message of the super cell and selects the small cell with the strongest sub-signal to access, or randomly selects a small cell in a small cell set in which sub-signal strength exceeds a threshold to access, or compares the sub-signal strength of the small cell with the sub-signal strength of the super cell and selects a small cell whose signal strength is greater than the signal strength of the super cell to access. If there is no small cell whose signal strength is greater than the signal strength of the super cell, the UE selects the super cell to access.

The predefined time-frequency position where the sub-signal of the small cell is sent may be a fixed time-frequency position or may be a predefined offset relative to the SSB of the super cell.

The threshold corresponding to the sub-signal of the small cell is configured by a signaling. The signaling is included in the system message of the super cell. The signaling may be configured for each small cell, or all small cells may use the same threshold. The threshold may be an absolute value, an offset value relative to the downlink signal strength of the super cell, or a threshold offset value for super cell reselection.

In an embodiment, a manner for accessing a small cell by the UE is provided.

Manner one: The UE detects a first system message of a small cell on a predefined time-frequency resource, or the UE detects the first system message of the small cell on a time-frequency resource of a predefined offset relative to a sub-signal time-frequency position. After the first system message is acquired, the downlink control channel corresponding to a second system message is detected on the search space configuration of the second system message indicated by the first system message. The second system message is acquired according to the downlink control channel. The small cell is accessed according to the second system message. The second system message includes the access message of the small cell. The first system message may be the system message born by a physical broadcast channel (master information block (MIB)). The second system message is the system message born by a physical downlink shared channel (system information block (SIB)).

Manner two: The UE detects the downlink control channel corresponding to the system message of the small cell in a predefined search space, acquires the system message of the small cell according to the downlink control channel, and accesses the small cell according to the system message of the small cell. The system message of the small cell includes the access message of the small cell. The system message refers to the system message born by a physical downlink shared channel.

The time-frequency position of the predefined search space may be a fixed time-frequency position, may be a predefined offset relative to the time-frequency position of the SSB of the super cell, or may be a predefined offset relative to the sub-signal time-frequency position of the small cell.

In an embodiment, the base station of the super cell sends the SSB and the system message of the super cell. The UE acquires the system message of the super cell. The UE in the idle state performs downlink synchronization, downlink measurement, and paging detection according to the SSB of the super cell and the system message of the super cell. When the downlink measurement value satisfies the cell handover trigger condition, the super cell reselection or handover is performed.

The system message of the super cell includes the access configuration information of the super cell, paging configuration information, the configuration information of the small cell, the access control information of the super cell, and the neighbor cell list information of the super cell.

The configuration information of the small cell includes the list information of the small cell. The list information of the small cell includes the ID information (sub-signal sequence information) of the small cell and sub-signal time-frequency position information (time-frequency position information or frequency point information of the small cell). The ID information (sub-signal sequence information) of the small cell is used for generating the sub-signal of the small cell.

The UE in the idle state performs detection on the downlink control channel search space corresponding to the sending of the paging message configured in the system message of the super cell. After the downlink control channel is detected, the downlink data channel is received according to the downlink control information born by the downlink control channel, and it is confirmed whether there is the paging message of the UE in the idle state according to the information born by the downlink data channel. If there is no paging message of the UE, the paging detection continues.

If there is the paging message of the UE, and the paging message indicates that the downlink data arrives or there is the uplink data for transmission, the UE searches for the sub-signal of the small cell at the sub-signal time-frequency position (the time-frequency position or the frequency point of the small cell) indicated by the configuration information of the small cell according to the configuration information of the small cell in the system message of the super cell and selects the small cell with the strongest sub-signal to access, or randomly selects a small cell in the small cell set in which the sub-signal strength exceeds the threshold to access, or compares the sub-signal strength of the small cell with the sub-signal strength of the super cell and selects the small cell whose signal strength is greater than the signal strength of the super cell to access. If there is no small cell whose signal strength is greater than the signal strength of the super cell, the UE selects the super cell to access.

For a manner in which the UE accesses the small cell, reference may be made to the access manner provided in the preceding embodiment, and details are not repeated in this embodiment.

In an embodiment, the base station of the super cell sends the SSB and the system message of the super cell. The UE acquires the system message of the super cell. The UE in the idle state performs downlink synchronization, downlink measurement, and paging detection according to the SSB of the super cell and the system message of the super cell. When the downlink measurement value satisfies the cell handover trigger condition, the super cell reselection or handover is performed.

The system message of the super cell includes the access configuration information of the super cell, paging configuration information, the access control information of the super cell, and the neighbor cell list information of the super cell.

The UE in the idle state performs detection on the downlink control channel search space corresponding to the sending of the paging message configured in the system message of the super cell. After the downlink control channel is detected, the downlink data channel is received according to the downlink control information born by the downlink control channel, and it is confirmed whether there is the paging message of the UE in the idle state according to the information born by the downlink data channel. If there is no paging message of the UE, the paging detection continues.

If there is the paging message of the UE, and the paging message indicates that the downlink data arrives or there is the uplink data for transmission. The UE searches for the sub-signal of the small cell at the predefined time-frequency position. The sub-signal is generated from a predefined sequence set. The UE detects multiple sub-signals and selects the small cell with the strongest sub-signal to access, or randomly selects a small cell in the small cell set in which the sub-signal strength exceeds the threshold to access, or compares the sub-signal strength of the small cell with the sub-signal strength of the super cell and selects the small cell whose signal strength is greater than the signal strength of the super cell to access. If there is no small cell whose signal strength is greater than the signal strength of the super cell, the UE selects the super cell to access.

The predefined time-frequency position where the sub-signal of the small cell is sent may be a fixed time-frequency position or may be a predefined offset relative to the SSB of the super cell.

For the manner in which the UE accesses the small cell, reference may be made to the access manner provided in the preceding embodiment, and details are not repeated in this embodiment.

In an embodiment, the base station of the super cell sends the SSB and the system message of the super cell. The UE acquires the system message of the super cell. The UE in the idle state performs downlink synchronization, downlink measurement, and paging detection according to the SSB of the super cell and the system message of the super cell. When the downlink measurement value satisfies the cell handover trigger condition, the super cell reselection or handover is performed.

The system message of the super cell includes the access configuration information of the super cell, paging configuration information, the configuration information of the small cell, the access control information of the super cell, and the neighbor cell list information of the super cell. The configuration information of the small cell includes the configuration information of the system message of the small cell.

The configuration information of the system message of the small cell includes that the downlink control information configuration (such as a search space time-frequency position, a mapping manner, the size of a candidate set, and aggregation level information) corresponding to the system message of each small cell is configured for the small cell. Alternatively, the configuration information of the system message of the small cell includes that all the small cells in the super cell share the same configuration information of the system message, and all the small cells share the same downlink control information search space.

When the UE in the idle state needs to access a cell (for example, the paging message of the UE is received, and the paging message is used to indicate the arrival of the downlink data or the uplink data for transmission), the UE detects the downlink control channel corresponding to the system message of the small cell on the system message search space of the small cell configured by the system message of the super cell. When the downlink control channel is detected, the system message of the small cell is received according to the downlink control information born by the downlink control channel, and the small cell is accessed according to the system message of the small cell. The system message of the small cell includes the access message of the small cell.

If the UE detects system messages of multiple small cells, the UE detects the signal strength of the multiple small cells according to the system messages and selects the small cell with the strongest signal to access, or randomly selects a small cell in a small cell set in which signal strength exceeds a threshold to access, or compares the signal strength of the small cell with the signal strength of the super cell and selects the small cell whose signal strength is greater than the signal strength of the super cell to access. If there is no small cell whose signal strength is greater than the signal strength of the super cell, the UE selects the super cell to access.

For the manner in which the UE accesses the small cell, reference may be made to the access manner provided in the preceding embodiment, and details are not repeated in this embodiment.

In an embodiment, the base station of the super cell sends the SSB and the system message of the super cell. The UE acquires the system message of the super cell. The UE in the idle state performs downlink synchronization, downlink measurement, and paging detection according to the SSB of the super cell and the system message of the super cell. When the downlink measurement value satisfies the cell handover trigger condition, the super cell reselection and handover are performed. After the UE in the idle state camps on the super cell, during the moving process of the UE (the handover process of a cell), the UE in the idle state does not select the small cell for measurement, does not select the small cell for camping, does not acquire the system message of the small cell, and does not monitor the paging message sent by the small cell (the system message of the small cell does not include the paging configuration information of the small cell).

The system message of the super cell includes the access configuration information of the super cell, paging configuration information, the configuration information of the small cell, the access control information of the super cell, and the neighbor cell list information of the super cell. The configuration information of the small cell includes the configuration information of the system message of the small cell and the list information of the small cell.

The list information of the small cell includes the ID information (sub-signal sequence information) of the small cell and sub-signal time-frequency position information (time-frequency position information or frequency point information of the small cell). The ID information (sub-signal sequence information) of the small cell is used for generating the sub-signal of the small cell.

The UE in the idle state performs detection on the downlink control channel search space corresponding to the sending of the paging message configured in the system message of the super cell. After the downlink control channel is detected, the downlink data channel is received according to the downlink control information born by the downlink control channel, and it is confirmed whether there is the paging message of the UE in the idle state according to the information born by the downlink data channel. If there is no paging message of the UE, the paging detection continues.

If there is the paging message of the UE, and the paging message indicates that the downlink data arrives (or there is the uplink data for transmission), the UE searches for the sub-signal (generated according to the ID information of the small cell) of the small cell at the sub-signal time-frequency position (the time-frequency position or the frequency point of the small cell) indicated by the configuration information of the small cell according to the configuration information of the small cell in the system message of the super cell and selects the small cell with the strongest sub-signal to access, or randomly selects a small cell in the small cell set in which the sub-signal strength exceeds the threshold to access, or compares the sub-signal strength of the small cell with the sub-signal strength of the super cell and selects the small cell whose signal strength is greater than the signal strength of the super cell to access. If there is no small cell whose signal strength is greater than the signal strength of the super cell, the UE selects the super cell to access.

The configuration information of the selected small cell is acquired in the configuration information of the small cell of the system message of the super cell according to the selected small cell. The UE detects the downlink control channel corresponding to the system message of the small cell on the system message search space of the small cell configured by the system message of the super cell. When the downlink control channel is detected, the system message of the small cell is received according to the downlink control information born by the downlink control channel, and the small cell is accessed according to the system message of the small cell. The system message of the small cell includes the access message of the small cell.

For the manner in which the UE accesses the small cell, reference may be made to the access manner provided in the preceding embodiment, and details are not repeated in this embodiment.

For the preceding embodiment, when the system message of the small cell includes the access control information of the small cell, the UE needs to determine whether the small cell may be accessed before accessing the small cell. Alternatively, the access control information of the small cell is included in the system message of the super cell. The UE confirms an accessible small cell according to the access control information of the small cell or a list of the small cell in the system message of the super cell and selects the sub-signal of the accessible small cell for detection. Alternatively, the access control information of the small cell may also be included in the system message of the super cell. The UE confirms an accessible small cell according to the access control information of the small cell or the list of the small cell in the system message of the super cell and selects the downlink control channel corresponding to the system message of the accessible small cell for detection.

For the preceding embodiment, the system message of the small cell sent by the small cell includes only the neighbor cell list information of the small cell. After a radio link fails in a connected state, or cell reselection is triggered, or a cell handover is triggered, the UE selects the small cell for camping or a handover or access according to the information of the neighbor small cells in the system message of the small cell. When there is no neighbor cell list information, the UE selects the super cell for measurement according to the list of the super cell in the system message of the super cell, selects the super cell for camping or a handover or access. Alternatively, the UE continues to perform re-access in the small cell, or selects the super cell where the small cell is located for camping or a handover or access, or selects the super cell to access the network according to the list information of the super cell in the system message of the small cell after the signal strength of the small cell is less than the threshold.

Alternatively, the system message of a cell includes the neighbor cell list information of the small cell and the list of the super cell. After a radio link fails in a connected state, or cell reselection is triggered, or a cell handover is triggered, the UE selects the small cell for camping or a handover or access according to the information of the small cell in the system message of the small cell. If the signal strength of all the small cells is less than the threshold, the UE selects the super cell for camping or a handover or access in the list of the super cell. Alternatively, the small cell and the super cell are measured according to the information of the small cell and the information of the super cell in the system message of the small cell, and the cell with the highest signal strength is selected for camping or a handover or access.

Alternatively, the system message of the small cell includes only the neighbor cell list information of the super cell. After a radio link fails in a connected state, or cell reselection is triggered, or a cell handover is triggered, the UE measures the super cell according to the list information of the super cell in the system message of the small cell and selects the super cell for camping or a handover or access according to the measurement result. Alternatively, after the signal strength of the small cell is less than the threshold, the super cell is selected for camping or a handover or access according to the list information of the super cell in the system message of the small cell.

Under the preceding structure of the small cell, paging is described.

After the UE enters the idle state from the connected state, the UE monitors the paging of the source small cell in the source small cell (the small cell where the UE is in the connected state). When the UE moves out of the source small cell, the UE monitors the paging of the super cell. At this time, the system message of the small cell includes the paging configuration information of the small cell. Alternatively, after the UE enters the idle state from the connected state, the UE monitors the paging of the source small cell and the paging of the super cell in the source small cell (the small cell where the UE is in the connected state). When the UE moves out of the source small cell, the UE monitors only the paging of the super cell. At this time, the system message of the small cell includes the paging configuration information of the small cell. Alternatively, after the UE enters the idle state from the connected state, the UE monitors only the paging of the super cell. At this time, the system message of the small cell does not include the paging configuration information of the small cell, and the system message of the small cell includes the paging configuration information of the super cell. The UE performs monitoring according to the paging configuration information of the super cell.

The base station first performs paging on the source small cell of the UE. If nothing is paged, paging is performed in the range of the super cell.

The preceding idle state also includes the inactive state newly added to 5G New Radio (NR) and other new non-connected states newly added to a future network.

The solutions in all the preceding embodiments can also be applied to multi-cell joint networking and a high and low frequency joint networking scenario.

The super cell transmits the SSB and the system information (SI) (including the SI of the existing cell and the configuration SI of a newly added small cell) of the super cell, that is, the small cells in a certain range or region share the same downlink synchronization channel and have the same subframe synchronization and frame synchronization. The small cell has the ID (generating a discovery signal) of the small cell and a specific system message (distributed system information (SI)). The UE may perform access on the exclusive access resource configured by the SI of each small cell. When the UE accesses the small cell, downlink synchronization and uplink path loss estimation are performed according to the discovery signal of the small cell. After access is performed, the specific parameter of the UE may be configured through the specific radio resource control (RRC) of the UE to implement a virtual cell. The UE in the idle state does not need to perform a cell handover in each small cell in the range of the super cell, does not need to perform synchronous tracking of the small cell on the small cell, and does not need to acquire the system message of the small cell. In this manner, the power consumption of the UE can be reduced. At the same time, paging of the same UE in multiple small cells is avoided, thereby reducing the waste of downlink network resources. At the same time, the small cell may send only a small quantity of discovery signals and distributed SI, thereby implementing energy saving of the base station.

The super cell and the small cell may be at the same frequency point or at different frequency points. For example, the super cell is located at a low frequency point, and the small cell is located at a high frequency point. The super cell and the small cell may belong to the same radio system. For example, the two belong to the 5G system, or the two belong to the 6G system or a future network, or the two may belong to different radio systems. For example, the super cell belongs to the 4G system, and the small cell belongs to the 5G system. Alternatively, the super cell belongs to the 4G system or the 5G system, and the small cell belongs to the 6G system or the future network.

When the super cell and the small cell belong to different frequency points, the system message of the super cell may include the frequency point information of the small cell.

If the time of the super cell and the time of the small cell are not synchronized, the system message of the super cell may also include the deviation information of the subframe/radio frame/symbol of the super cell and the deviation information of the subframe/radio frame/symbol of the small cell.

When the super cell and the small cell belong to different radio systems, the system message of the super cell may include the frequency information and radio system type information of the small cell.

In an embodiment, a resource maintenance method is provided. As shown in FIG. 5, the resource maintenance method provided by this embodiment of the present application mainly includes steps S41 and S42.

In S41, CP-PUR configuration information is sent. The CP-PUR configuration information includes a CP-PUR configuration identifier.

In S42, a first message of a CP scheme is received. The first message carries the CP-PUR configuration identifier. The first message is used to identify or maintain the CP-PUR of the first node.

In an embodiment, the first message includes radio resource control (RRC) Message 5 or a PUR configuration request message.

In an embodiment, the CP-PUR configuration identifier includes at least one of a digital identifier, a joint PUR radio network temporary identifier (RNTI) and supplemental digital identifier, a joint truncated PUR RNTI and supplemental digital identifier, the time domain information and frequency domain information in joint PUR configuration, or a multi-user multiplexing information indication.

In an embodiment, a resource maintenance method is provided. As shown in FIG. 6, the resource maintenance method provided by this embodiment of the present application mainly includes steps S61 and S62.

In S61, the CP-PUR configuration information is received. The CP-PUR configuration information includes a CP-PUR configuration identifier.

In S62, in the case where the first node configures the CP-PUR, the first message is sent. The first message carries the CP-PUR configuration identifier.

The first message is used by the second node to identify or maintain the CP-PUR of the first node.

In an embodiment, the first message includes radio resource control (RRC) Message 5 or a PUR configuration request message.

In an embodiment, the CP-PUR configuration identifier includes at least one of a digital identifier, a joint PUR RNTI and supplemental digital identifier, a joint truncated PUR RNTI and supplemental digital identifier, the time domain information and frequency domain information in joint PUR configuration, or a multi-user multiplexing information indication.

To save the signaling overhead of small data transmission, an uplink resource (UR) is preconfigured for the UE when an RRC connection is released. The PUR includes at least the time domain information of the PUR, the uplink scheduling information of the PUR, the RNTI of PUR transmission (PUR-RNTI), physical downlink control channel (PDCCH) search space information corresponding to the PUR transmission, and a PUR transmission response timer.

When the UE in the idle state or the inactive state has an uplink transmission requirement, uplink information may be directly sent on the PUR.

The base station performs PUR maintenance in the following manners: The base station reconfigures or releases the PUR based on the PUR configuration request sent by the UE, and the PUR is released when the number of unused times of the PUR reaches a predefined threshold.

However, for the UE in the connection mode of the CP scheme, if the UE does not use the PUR in the connection establishment process, the base station cannot know whether the UE is configured with the PUR or cannot know the configured PUR information of the UE.

Figure 7:
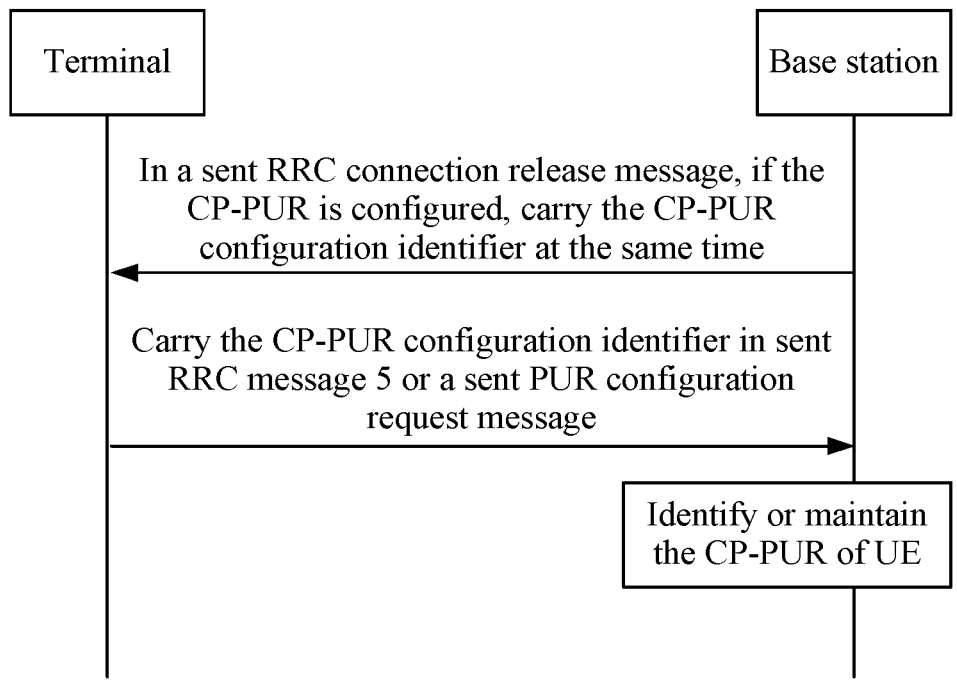
FIG. 7 is an interaction diagram of a resource maintenance method according to an embodiment of the present application.

For this reason, in this embodiment, a method in which the base station obtains the PUR configuration information of the UE in the connection mode of the CP scheme is provided and is used for maintaining the CP-PUR at the base station. As shown in FIG. 7, the method mainly includes the steps below.

In step 1, in the RRC connection release message sent by the base station to the UE, if the CP-PUR is configured, the CP-PUR configuration identifier is carried at the same time.

In step 2, if the UE is configured with the CP-PUR, the CP-PUR configuration identifier is carried in the RRC Message 5 or PUR preconfiguration request message of the CP scheme.

In step 3, the base station identifies or maintains the CP-PUR of the UE.

The CP-PUR configuration identifier includes at least one of a digital identifier, a joint PUR RNTI and supplemental digital identifier, a joint truncated PUR RNTI and supplemental digital identifier, the time domain information and frequency domain information in joint PUR configuration, or a multi-user multiplexing information indication (puschCyclicShift).

The CP-PUR configuration identifier is 8 bits or 12 bits or 16 bits or 20 bits or 24 bits or 28 bits or 32 bits or 36 bits or 40 bits.

When the CP-PUR configuration identifier is constituted by the PUR RNTI and the supplemental digital identifier, the length of the PUR RNTI is 16 bits or 24 bits or truncated 8 bits (first 8 bits or last 8 bits or middle 8 bits) or truncated 4 bits (first 4 bits or last 4 bits or middle 4 bits), and the supplemental digital identifier is 4 bits or 8 bits or 12 bits or 16 bits or 24 bits.

The digital identifier is in the form of a character string composed of 0 and 1 or a binary identifier.

The CP-PUR means that the UE uses Control Plane Cellular Internet of Things-Evolved Packet System (CIoT EPS) optimizations scheme and that the PUR is configured.

The RRC Message 5 of the CP scheme includes at least one of an RRC connection setup completion message, an RRC connection reestablishment completion message, or an RRC connection reconfiguration completion message.

Figure 8:
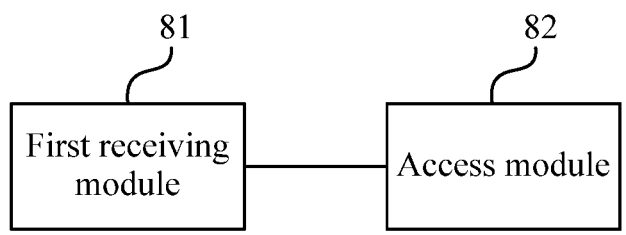
FIG. 8 is a diagram illustrating the structure of a network access apparatus according to an embodiment of the present application.

In an embodiment, the present application provides a network access apparatus. FIG. 8 is a diagram illustrating the structure of a network access apparatus according to an embodiment of the present application. The apparatus can be applied to the case where the UE needs to handover cells frequently in the dense deployment scenario. The network access apparatus may be performed by software and/or hardware. The apparatus is configured at the first node.

As shown in FIG. 8, the network access apparatus provided in this embodiment of the present application mainly includes a first receiving module 81 and an access module 82. The first receiving module 81 is configured to receive the system message of the first cell sent by the second node. The system message of the first cell includes the configuration information of the second cell. The access module 82 is configured to access the second cell based on the configuration information of the second cell.

In an embodiment, the configuration information of the second cell includes one or more of the indication information of the second cell, the configuration information of the system message of the second cell, the sub-signal configuration information of the second cell, the list information of the second cell, and the access configuration information of the second cell.

In an embodiment, the configuration information of the system message of the second cell includes one or more of the time-frequency position information corresponding to the system message of the second cell, the downlink control channel search space configuration information corresponding to the system message of the second cell, and the reference signal configuration information corresponding to the system message of the second cell.

In an embodiment, the second cell is accessed in the following manners based on the configuration information of the second cell: The downlink control channel corresponding to the system message of the second cell is detected; the system message of the second cell is acquired based on the downlink control channel; and the second cell is accessed based on the system message of the second cell.

In an embodiment, the downlink control channel corresponding to the system message of the second cell is detected in the following manner: When the configuration information of the second cell includes the configuration information of the system message of the second cell, and the configuration information of the system message of the second cell includes the downlink control channel search space configuration information corresponding to the system message of the second cell, the downlink control channel corresponding to the system message of the second cell is detected on the resource corresponding to the configuration information of the system message of the second cell.

In an embodiment, the downlink control channel corresponding to the system message of the second cell is detected in the following manner: When the configuration information of the second cell does not include the downlink control channel search space configuration information corresponding to the system message of the second cell, the downlink control channel corresponding to the system message of the second cell is detected at the time-frequency position of the preset search space.

In an embodiment, the time-frequency position of the preset search space includes one or more of the following: a preset fixed time-frequency position, a preset offset relative to the time-frequency position of the SSB of the first cell, and a preset offset relative to a sub-signal time-frequency position.

In an embodiment, the second cell is accessed in the following manners based on the system message of the second cell: The sub-signal of the second cell is detected; and the second cell whose sub-signal satisfies the requirement is selected to access the network.

In an embodiment, the second cell whose sub-signal satisfies the requirement includes one or more of a second cell having the strongest sub-signal strength, any second cell in the second cell set in which the sub-signal strength exceeds the threshold, and a second cell whose signal strength is greater than the signal strength of the first cell.

In an embodiment, the sub-signal of the second cell is detected in the following manner: The sub-signal of the second cell is searched at the sub-signal time-frequency position corresponding to the second cell. The sub-signal time-frequency position corresponding to the second cell is indicated by sub-signal time-frequency position information of the second cell in the sub-signal configuration information of the second cell.

In an embodiment, the sub-signal of the second cell is detected in the following manner: The sub-signal of the second cell is detected at the preset time-frequency position. The preset time-frequency position includes one or more of the following: a preset fixed time-frequency position and a preset offset relative to the time-frequency position of the SSB of the first cell.

In an embodiment, the sub-signal configuration information of the second cell includes the sub-signal sequence information corresponding to the second cell. The sub-signal sequence information corresponding to the second cell is used to generate the sub-signal of the second cell.

In an embodiment, before the second cell is accessed, the method also includes the following: The accessible second cell is determined based on the access control information of the second cell. The access control information of the second cell is carried by the system message of the first cell and/or the system message of the second cell.

In an embodiment, after the second cell is accessed based on the configuration information of the second cell, the method also includes the following: After the connected radio link fails, or the cell reselection is triggered, or the cell handover is triggered, when the system message of the second cell does not include the cell list information, a cell is selected to access based on the cell list in the system message of the first cell; or when the system message of the second cell does not include the cell list information, the first cell is accessed.

In an embodiment, after the second cell is accessed based on the configuration information of the second cell, the method also includes the following: After the connected radio link fails, or the cell reselection is triggered, or the cell handover is triggered, the second cell or the first cell is selected to access based on the cell list information in the system message of the second cell. The cell list information includes the list information of the second cell and/or the list information of the first cell.

In an embodiment, the second cell is accessed in the following manner based on the system message of the second cell: When the configuration information of the second cell includes the access configuration information of the second cell, the access signal or access data is sent to access the second cell based on the access configuration information of the second cell.

In an embodiment, the access configuration information of the second cell includes one or more of the time-frequency position information of the access signal, the sequence information of the access signal, the time-frequency position information of the access data, the reference signal information of the access data, and the configuration information of the downlink control information corresponding to the access response message.

In an embodiment, the apparatus also includes a paging module. The paging module is configured to, after the first node accesses the second cell, monitor, by the first node, paging according to the paging configuration information in the system message of the first cell when the first node enters the idle state from the connected state or enters the inactive state from the connected state; or after the first node accesses the second cell, monitor, by the first node, paging according to the paging configuration information in the system message of the second cell when the first node enters the idle state from the connected state or enters the inactive state from the connected state, and the first node also camps on the second cell where the first node is in the connected state; or after the first node accesses the second cell, monitor, by the first node, paging according to the paging configuration information in the system message of the first cell when the first node enters the idle state from the connected state or enters the inactive state from the connected state, and the first node does not camp on the second cell where the first node is in the connected state.

In an embodiment, the method also includes the following: When the first node is in the idle state or the inactive state, the first node selects a cell based on the signal strength of the first cell.

In an embodiment, the method also includes the following: When the first node is in the idle state or the inactive state, after cell reselection is triggered, or a cell handover is triggered, the first node selects a cell based on the first cell information in the cell list information in the system message of the first cell.

The network access apparatus provided by this embodiment may execute the network access method provided by any embodiment of the present application and has functional modules and beneficial effects corresponding to the method executed. For technical details not described in detail in this embodiment, reference may be made to the network access method according to any embodiment of the present application.

Units and modules included in the embodiment of the network access apparatus are just divided according to functional logic, and the division is not limited to this, as long as the corresponding functions can be implemented. In addition, the names of each functional unit are just intended for distinguishing and are not to limit the protection scope of the present application.

Figure 9:
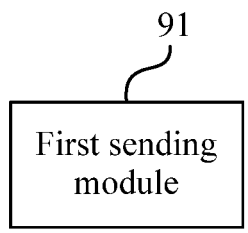
FIG. 9 is a diagram illustrating the structure of a network access apparatus according to an embodiment of the present application.

In an embodiment, the present application provides a network access apparatus. FIG. 9 is a diagram illustrating the structure of a network access apparatus according to an embodiment of the present application. The apparatus can be applied to the case where the UE needs to handover cells frequently in the dense deployment scenario. The network access apparatus may be performed by software and/or hardware. The apparatus is configured at the second node.

As shown in FIG. 9, the network access apparatus provided in this embodiment of the present application mainly includes a first sending module 91. The first sending module 91 is configured to send the system message of the first cell. The system message of the first cell includes the configuration information of the second cell. The configuration information of the second cell is used to instruct the first node to access the second cell.

In an embodiment, the configuration information of the second cell includes one or more of the indication information of the second cell, the configuration information of the system message of the second cell, the sub-signal configuration information of the second cell, the list information of the second cell, the access configuration information of the second cell, and the access control information of the second cell.

In an embodiment, the indication information of the second cell is used to indicate whether the second cell exists. The configuration information of the system message of the second cell includes one or more of the time-frequency position information corresponding to the system message of the second cell, the downlink control channel search space configuration information corresponding to the system message of the second cell, and the reference signal configuration information corresponding to the system message of the second cell. The sub-signal configuration information of the second cell includes the sub-signal time-frequency position information of the second cell and/or the sub-signal sequence information of the second cell. The list information of the second cell includes the frequency point information of the second cell and/or the identifier information of the second cell. The access configuration information of the second cell includes the time-frequency position information of the access signal of the second cell or the time-frequency position information of the access channel of the second cell.

The network access apparatus provided by this embodiment may execute the network access method provided by any embodiment of the present application and has functional modules and beneficial effects corresponding to the method executed. For technical details not described in detail in this embodiment, reference may be made to the network access method according to any embodiment of the present application.

Units and modules included in the embodiment of the network access apparatus are just divided according to functional logic, and the division is not limited to this, as long as the corresponding functions can be implemented. In addition, the names of each functional unit are just intended for distinguishing and are not to limit the protection scope of the present application.

Figure 10:
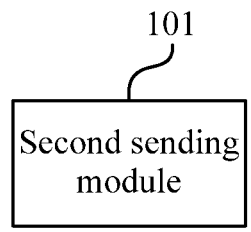
FIG. 10 is a diagram illustrating the structure of a network access apparatus according to an embodiment of the present application.

In an embodiment, the present application provides a network access apparatus. FIG. 10 is a diagram illustrating the structure of a network access apparatus according to an embodiment of the present application. The apparatus can be applied to the case where the UE needs to handover cells frequently in the dense deployment scenario. The network access apparatus may be performed by software and/or hardware. The apparatus is configured at the third node.

As shown in FIG. 10, the network access apparatus provided in this embodiment of the present application mainly includes a second sending module 101. The second sending module 101 is configured to send the system message of the second cell. The system message of the second cell is used to instruct the first node to access the second cell. The time-frequency position where the system message of the second cell is sent is configured by the system message of the first cell. Alternatively, the downlink control channel search space corresponding to the system message of the second cell is configured by the system message of the first cell. Alternatively, the time-frequency position of the downlink control channel search space corresponding to the system message of the second cell is predefined.

In an embodiment, the system message of the second cell includes one or more of the access configuration information of the second cell, the neighbor cell list information of the second cell, the neighbor cell list information of the first cell, the access control information of the second cell, and the paging configuration information of the second cell.

In an embodiment, the apparatus also includes a second receiving module. The second receiving module is configured to receive the access signal or access data sent by the first node. The second sending module 101 is configured to send the access response to the first node. The access response is used to indicate that the first node accesses the second cell.

In an embodiment, the second sending module 101 is configured to send the sub-signal of the second cell. The sub-signal of the second cell is used for measuring the first node. The time-frequency position where the sub-signal of the second cell is sent is configured by the system message of the first cell.

In an embodiment, the predefined time-frequency position of the search space includes one or more of the following: a preset fixed time-frequency position, a preset offset relative to the time-frequency position of the SSB of the first cell, and a preset offset relative to a sub-signal time-frequency position.

The network access apparatus provided by this embodiment may execute the network access method provided by any embodiment of the present application and has functional modules and beneficial effects corresponding to the method executed. For technical details not described in detail in this embodiment, reference may be made to the network access method according to any embodiment of the present application.

Units and modules included in the embodiment of the network access apparatus are just divided according to functional logic, and the division is not limited to this, as long as the corresponding functions can be implemented. In addition, the names of each functional unit are just intended for distinguishing and are not to limit the protection scope of the present application.

Figure 11:
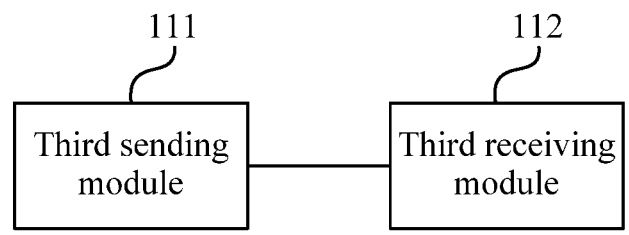
FIG. 11 is a diagram illustrating the structure of a resource maintenance apparatus according to an embodiment of the present application.

In an embodiment, a resource maintenance apparatus is provided. As shown in FIG. 11, the resource maintenance apparatus provided by this embodiment of the present application mainly includes a third sending module 111 and a third receiving module 112.

The third sending module 111 is configured to send the CP-PUR configuration information. The CP-PUR configuration information includes a CP-PUR configuration identifier. The third receiving module 112 is configured to receive the first message of the CP scheme. The first message carries the CP-PUR configuration identifier. The first message may be used to identify or maintain the CP-PUR of the first node or may be used in other manners.

In an embodiment, the first message includes radio resource control (RRC) Message 5 or a PUR configuration request message.

In an embodiment, the CP-PUR configuration identifier includes at least one of a digital identifier, a joint PUR RNTI and supplemental digital identifier, a joint truncated PUR RNTI and supplemental digital identifier, the time domain information and frequency domain information in joint PUR configuration, or a multi-user multiplexing information indication.

Figure 12:
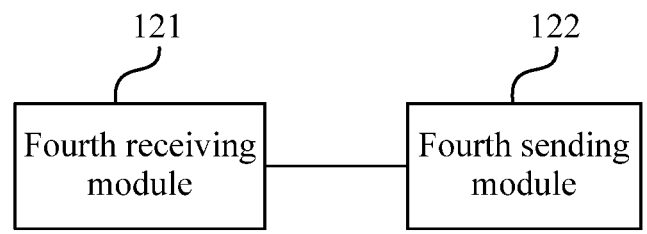
FIG. 12 is a diagram illustrating the structure of a resource maintenance apparatus according to an embodiment of the present application.

In an embodiment, a resource maintenance apparatus is provided. As shown in FIG. 12, the resource maintenance apparatus provided by this embodiment of the present application mainly includes a fourth receiving module 121 and a fourth sending module 122.

The fourth receiving module 121 is configured to receive the CP-PUR configuration information. The CP-PUR configuration information includes a CP-PUR configuration identifier. The fourth sending module 122 is configured to, in the case where the first node configures the CP-PUR, send the first message. The first message carries the CP-PUR configuration identifier. The first message is used by the second node to identify or maintain the CP-PUR of the first node.

In an embodiment, the first message includes radio resource control (RRC) Message 5 or a PUR configuration request message.

In an embodiment, the CP-PUR configuration identifier includes one of a digital identifier, a joint PUR RNTI and supplemental digital identifier, a joint truncated PUR RNTI and supplemental digital identifier, the time domain information and frequency domain information in joint PUR configuration, or a multi-user multiplexing information indication.

Figure 13:
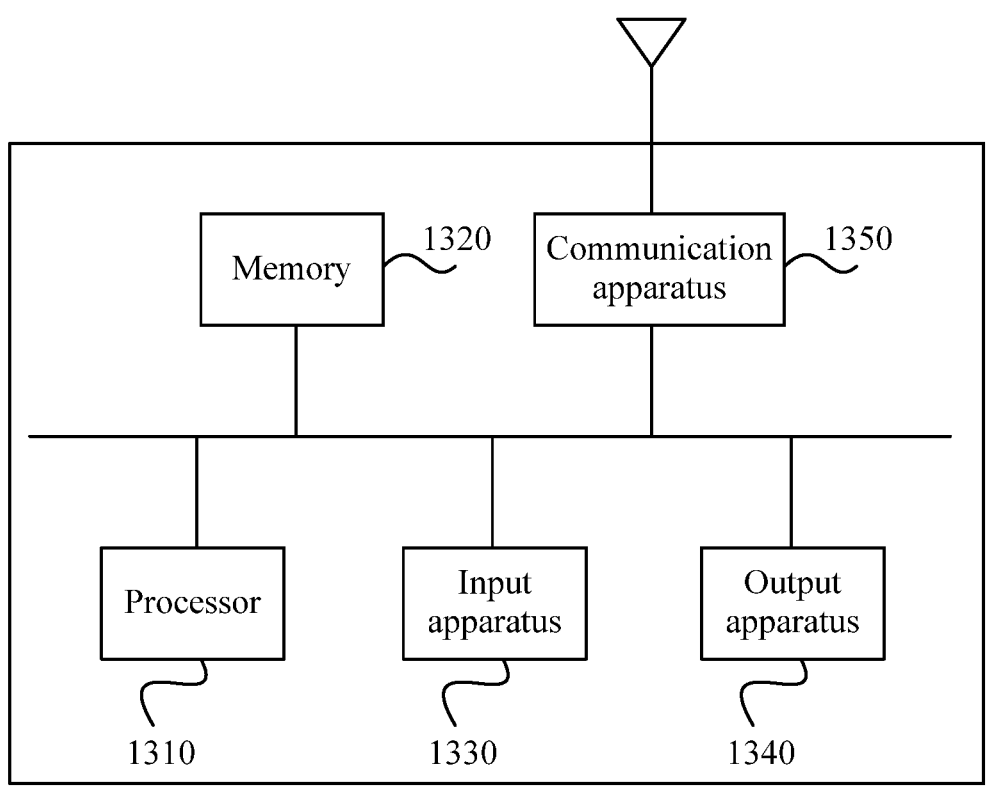
FIG. 13 is a diagram illustrating the structure of a device according to an embodiment of the present application.

An embodiment of the present application provides a device. FIG. 13 is a diagram illustrating the structure of a device according to an embodiment of the present application. As shown in FIG. 13, the device includes a processor 1310, a memory 1320, an input apparatus 1330, an output apparatus 1340, and a communication apparatus 1350. One or more processors 1310 may be disposed in the device, and one processor 1310 is used as an example in FIG. 13. The processor 1310, the memory 1320, the input apparatus 1330, and the output apparatus 1340 in the device may be connected by a bus or other modes. Connecting by a bus is used as an example in FIG. 13.

As a computer-readable storage medium, the memory 1320 may be configured to store software programs and computer-executable programs and modules, such as program instructions/modules (for example, the first receiving module 81 and the access module 82 in the network access apparatus) corresponding to the network access method according to the embodiments of the present application, or such as program instructions/modules (for example, the first sending module 91 in the network access apparatus) corresponding to the network access method according to the embodiments of the present application, or such as program instructions/modules (for example, the second sending module 101 in the network access apparatus) corresponding to the network access method according to the embodiments of the present application. The processor 1310 runs the software programs, instructions and modules stored in the memory 1320 to perform function applications and data processing of the device, that is, to perform any method provided by the embodiments of the present application.

The memory 1320 may mainly include a program storage region and a data storage region, where the program storage region may store an operating system and an application program required by at least one function while the data storage region may store data created depending on the use of the device. Additionally, the memory 1320 may include a high-speed random-access memory and may also include a nonvolatile memory, such as at least one disk memory, a flash memory, or another nonvolatile solid-state memory. In some examples, the memory 1320 may include memories which are remotely disposed relative to the processor 1310, and these remote memories may be connected to the device via a network. Examples of the preceding network include, but are not limited to, the Internet, an intranet, a local area network, a mobile communication network, and a combination thereof.

The input device 1330 may be configured to receive inputted digital or character information and generate key signal input related to user settings and function control of the device. The output device 1340 may include display devices such as a display screen.

The communication apparatus 1350 may include a receiver and a sender. The communication apparatus 1350 is configured to perform information transceiving communication under the control of the processor 1310.

In the case where the preceding device is the first node, the processor 1310 runs the programs stored in the system memory 1320 to execute function applications and data processing, for example, the network access method provided by the embodiments of the present application is performed. The method includes the following.

The system message of the first cell sent by the second node is received. The system message of the first cell includes the configuration information of the second cell. The second cell is accessed based on the configuration information of the second cell.

The processor 1310 may also perform the technical solution of the network access method provided by any embodiment of the present application. For the hardware structure and function of the device, reference may be made to the content description of this embodiment.

In the case where the preceding device is the second node, the processor 1310 runs the programs stored in the system memory 1320 to execute function applications and data processing, for example, the network access method provided by the embodiments of the present application is performed. The method includes the following.

The system message of the first cell is sent. The system message of the first cell includes the configuration information of the second cell. The configuration information of the second cell is used to instruct the first node to access the second cell.

The processor 1310 may also perform the technical solution of the network access method provided by any embodiment of the present application. For the hardware structure and function of the device, reference may be made to the content description of this embodiment.

In the case where the preceding device is the third node, the processor 1310 runs the programs stored in the system memory 1320 to execute function applications and data processing, for example, the network access method provided by the embodiments of the present application is performed. The method includes the following.

The system message of the second cell is sent. The system message of the second cell is used to instruct the first node to access the second cell. The time-frequency position where the system message of the second cell is sent is configured by the system message of the first cell. Alternatively, the downlink control channel search space corresponding to the system message of the second cell is configured by the system message of the first cell. Alternatively, the time-frequency position of the downlink control channel search space corresponding to the system message of the second cell is predefined.

The processor 1310 may also perform the technical solution of the network access method provided by any embodiment of the present application. For the hardware structure and function of the device, reference may be made to the content description of this embodiment.

In the case where the preceding device is the second node, the processor 1310 runs the programs stored in the system memory 1320 to execute function applications and data processing, for example, the resource maintenance method provided by the embodiments of the present application is performed. The method includes the following.

The CP-PUR configuration information is sent. The CP-PUR configuration information includes a CP-PUR configuration identifier. The first message of the CP scheme is received. The first message carries the CP-PUR configuration identifier. The first message is used to identify or maintain the CP-PUR of the first node.

The processor 1310 may also perform the technical solution of the network access method provided by any embodiment of the present application. For the hardware structure and function of the device, reference may be made to the content description of this embodiment.

In the case where the preceding device is the first node, the processor 1310 runs the programs stored in the system memory 1320 to execute function applications and data processing, for example, the resource maintenance method provided by the embodiments of the present application is performed. The method includes the following.

The CP-PUR configuration information is received. The CP-PUR configuration information includes a CP-PUR configuration identifier. In the case where the first node configures the CP-PUR, the first message is sent. The first message carries the CP-PUR configuration identifier. The first message is used by the second node to identify or maintain the CP-PUR of the first node or may be used in other manners.

The processor 1310 may also perform the technical solution of the network access method provided by any embodiment of the present application. For the hardware structure and function of the device, reference may be made to the content description of this embodiment.

An embodiment of the present application provides a storage medium including computer-executable instructions. The computer-executable instructions are configured to perform a network access method when executed by a computer processor. The method is applied to the first node and includes the following.

The system message of the first cell sent by the second node is received. The system message of the first cell includes the configuration information of the second cell. The second cell is accessed based on the configuration information of the second cell.

Embodiments of the present application provide a storage medium including computer-executable instructions, the computer-executable instructions implement not only the above method operations but also related operations in the network access method provided by any embodiment of the present application.

An embodiment of the present application provides a storage medium including computer-executable instructions. The computer-executable instructions are configured to perform a network access method when executed by a computer processor. The method is applied to the second node and includes the following.

The system message of the first cell is sent. The system message of the first cell includes the configuration information of the second cell. The configuration information of the second cell is used to instruct the first node to access the second cell.

In the storage medium including computer-executable instructions provided by this embodiment of the present application, the computer-executable instructions may execute not only the preceding network access method operations but also related operations in the receiving method provided by any embodiment of the present application.

An embodiment of the present application provides a storage medium including computer-executable instructions. The computer-executable instructions are configured to perform a network access method when executed by a computer processor. The method is applied to the third node and includes the following.

The system message of the second cell is sent. The system message of the second cell is used to instruct the first node to access the second cell. The time-frequency position where the system message of the second cell is sent is configured by the system message of the first cell. Alternatively, the downlink control channel search space corresponding to the system message of the second cell is configured by the system message of the first cell. Alternatively, the time-frequency position of the downlink control channel search space corresponding to the system message of the second cell is predefined.

Embodiments of the present application provide a storage medium including computer-executable instructions, the computer-executable instructions implement not only the above method operations but also related operations in the network access method provided by any embodiment of the present application.

An embodiment of the present application provides a storage medium including computer-executable instructions. The computer-executable instructions are configured to perform a resource maintenance method when executed by a computer processor. The method is applied to the second node and includes the following.

The CP-PUR configuration information is sent. The CP-PUR configuration information includes a CP-PUR configuration identifier. The first message of the CP scheme is received. The first message carries the CP-PUR configuration identifier. The first message is used to identify or maintain the CP-PUR of the first node.

Embodiments of the present application provide a storage medium including computer-executable instructions, the computer-executable instructions implement not only the above method operations but also related operations in the network access method provided by any embodiment of the present application.

An embodiment of the present application provides a storage medium including computer-executable instructions. The computer-executable instructions are configured to perform a resource maintenance method when executed by a computer processor. The method is applied to the first node and includes the following.

The CP-PUR configuration information is received. The CP-PUR configuration information includes a CP-PUR configuration identifier. In the case where the first node configures the CP-PUR, the first message is sent. The first message carries the CP-PUR configuration identifier. The first message is used by the second node to identify or maintain the CP-PUR of the first node.

Embodiments of the present application provide a storage medium including computer-executable instructions, the computer-executable instructions implement not only the above method operations but also related operations in the network access method provided by any embodiment of the present application.

From the preceding description of the embodiments, the present application may be implemented by means of both software and required general-purpose hardware, and also by means of hardware. The technical solutions of the present application may be essentially embodied in the form of a software product. The software product in a computer may be stored in a computer-readable storage medium such as a floppy disk, a read-only memory (ROM), a random-access memory (RAM), a flash memory, a hard disk, or an optical disc in the computer and includes several instructions for enabling a computer device (which may be a personal computer, a server, or a network device) to perform the method of the embodiments of the present application.

The term user terminal encompasses any appropriate type of radio user device, such as a mobile phone, a portable data processing apparatus, a portable web browser, or a vehicle-mounted mobile station.

In general, multiple embodiments of the present application may be implemented in hardware or special-purpose circuits, software, logics, or any combination thereof. For example, some aspects may be implemented in hardware while other aspects may be implemented in firmware or software executable by a controller, a microprocessor, or another computing apparatus, though the present application is not limited thereto.

The embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow in the drawings of the present application may represent program steps, or may represent interconnected logic circuits, modules, and functions, or may represent a combination of program steps and logic circuits, modules, and functions. Computer programs may be stored in a memory. The memory may be of any type suitable for a local technical environment and may be implemented using any suitable data storage technology, such as, but not limited to, a read-only memory (ROM), a random access memory (RAM) and an optical memory apparatus and system (a digital video disc (DVD) or a compact disk (CD)). A computer-readable medium may include a non-transitory storage medium. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. A network access method, applied to a first node, comprising:
   receiving a system message of a first cell sent by a second node, wherein the system message of the first cell comprises configuration information of a second cell; and
   accessing the second cell based on the configuration information of the second cell,
   wherein accessing the second cell based on the configuration information of the second cell comprises:
   detecting a downlink control channel corresponding to a system message of the second cell based on the configuration information of the second cell;
   acquiring the system message of the second cell based on the downlink control channel; and
   accessing the second cell based on the system message of the second cell,
   wherein detecting the downlink control channel corresponding to the system message of the second cell based on the configuration information of the second cell comprises:
   in a case where the configuration information of the second cell comprises configuration information of the system message of the second cell, and the configuration information of the system message of the second cell comprises downlink control channel search space configuration information corresponding to the system message of the second cell, detecting the downlink control channel corresponding to the system message of the second cell on a resource corresponding to the configuration information of the system message of the second cell.

2. The method according to claim 1, wherein detecting the downlink control channel corresponding to the system message of the second cell based on the configuration information of the second cell comprises:
   in a case where the configuration information of the second cell does not comprise downlink control channel search space configuration information corresponding to the system message of the second cell, detecting the downlink control channel corresponding to the system message of the second cell at a time-frequency position of a preset search space.

3. The method according to claim 2, wherein the time-frequency position of the preset search space comprises at least one of the following:
   a preset fixed time-frequency position, a preset offset relative to a time-frequency position of a synchronization signal block (SSB) of the first cell, or a preset offset relative to a sub-signal time-frequency position.

4. The method according to claim 1, before accessing the second cell, further comprising:
   determining an accessible second cell based on access control information of the second cell, wherein the access control information of the second cell is carried by at least one of the system message of the first cell or a system message of the second cell.

5. The method according to claim 1, after accessing the second cell based on the configuration information of the second cell, further comprising:
   after a radio link fails in a connected state, or cell reselection is triggered, or a cell handover is triggered,
   in a case where a system message of the second cell does not comprise cell list information, selecting a cell to access based on a cell list in the system message of the first cell; or
   in the case where the system message of the second cell does not comprise the cell list information, accessing the first cell.

6. The method according to claim 1, after accessing the second cell based on the configuration information of the second cell, further comprising:
   after a radio link fails in a connected state, or cell reselection is triggered, or a cell handover is triggered, selecting the second cell or the first cell to access based on cell list information in a system message of the second cell, wherein the cell list information comprises at least one of list information of the second cell or list information of the first cell.

7. The method of claim 1, wherein,
   after the first node accesses the second cell, in a case where the first node enters an idle state from a connected state or enters an inactive state from a connected state, the first node monitors for pages according to paging configuration information in the system message of the first cell; or
   after the first node accesses the second cell, in a case where the first node enters an idle state from a connected state or enters an inactive state from a connected state, and the first node also camps on the second cell where the first node is in the connected state, the first node monitors for pages according to paging configuration information in a system message of the second cell where the first node camps; or
   after the first node accesses the second cell, in a case where the first node enters an idle state from a connected state or enters an inactive state from the connected state, and the first node does not camp on the second cell where the first node is in the connected state, the first node monitors for pages according to paging configuration information in the system message of the first cell.

8. The method of claim 1, further comprising:
   in a case where the first node is in an idle state or an inactive state, selecting a cell by the first node based on signal strength of the first cell.

9. The method of claim 1, further comprising:
in a case where the first node is in an idle state or an inactive state, after cell reselection is triggered, or a cell handover is triggered, selecting a cell by the first node based on first cell information in cell list information in the system message of the first cell.

10. The method according to claim 1, wherein the configuration information of the second cell comprises at least one of the following:
indication information of the second cell, configuration information of a system message of the second cell, sub-signal configuration information of the second cell, list information of the second cell, or access configuration information of the second cell, wherein the indication information of the second cell is used to indicate whether the second cell exists.

11. The method according to claim 10, wherein the configuration information of the system message of the second cell comprises at least one of the following:
time-frequency position information corresponding to the system message of the second cell, downlink control channel search space configuration information corresponding to the system message of the second cell, or reference signal configuration information corresponding to the system message of the second cell.

12. The method according to claim 10, wherein a plurality of second cells are configured, and accessing the second cell based on the configuration information of the second cell comprises:
accessing a second cell of the plurality of second cells based on the sub-signal configuration information of the second cell.

13. The method according to claim 10, wherein the sub-signal configuration information of the second cell comprises sub-signal sequence information corresponding to the second cell, wherein the sub-signal sequence information corresponding to the second cell is used to generate a sub-signal of the second cell.

14. The method according to claim 10, wherein accessing the second cell based on the configuration information of the second cell comprises:
in a case where the configuration information of the second cell comprises the access configuration information of the second cell, sending an access signal or access data to access the second cell based on the access configuration information of the second cell.

15. The method according to claim 14, wherein the access configuration information of the second cell comprises at least one of the following:
time-frequency position information of the access signal, sequence information of the access signal, time-frequency position information of the access data, reference signal information of the access data, or configuration information of downlink control information corresponding to an access response message.

16. A network access method, applied to a second node, comprising:
sending a system message of a first cell, wherein the system message of the first cell comprises configuration information of a second cell; and the configuration information of the second cell is used to instruct a first node to access the second cell,
wherein the configuration information of the second cell is used to instruct a first node to access the second cell comprises:
sending a downlink control channel corresponding to a system message of the second cell based on the configuration information of the second cell; and
and sending the system message of the second cell based on the downlink control channel,
wherein sending the downlink control channel corresponding to the system message of the second cell based on the configuration information of the second cell comprises:
in a case where the configuration information of the second cell comprises configuration information of the system message of the second cell, and the configuration information of the system message of the second cell comprises downlink control channel search space configuration information corresponding to the system message of the second cell, sending the downlink control channel corresponding to the system message of the second cell on a resource corresponding to the configuration information of the system message of the second cell.

17. A device, comprising
at least one processor; and
a memory configured to store at least one program,
wherein when executing the at least one program, the at least one processor performs the method according to claim 1.

18. A non-transitory storage medium storing a computer program, wherein when executing the computer program, a processor performs the method according to claim 1.

19. A device, comprising
at least one processor; and
a memory configured to store at least one program,
wherein when executing the at least one program, the at least one processor performs the method according to claim 16.

* * * * *